(12) United States Patent  
Tantasirikorn

(10) Patent No.: US 7,255,447 B2
(45) Date of Patent: Aug. 14, 2007

(54) SYSTEMS AND METHODS FOR PROJECTION MIRROR ADJUSTMENT

(75) Inventor: Thitipant Tantasirikorn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 270 days.

(21) Appl. No.: 11/182,617

(22) Filed: Jul. 15, 2005

(65) Prior Publication Data

US 2007/0013877 A1    Jan. 18, 2007

(51) Int. Cl.
  *G03B 21/28*    (2006.01)
(52) U.S. Cl. ........................................ 353/77
(58) Field of Classification Search ............. 353/98, 353/99, 69, 70, 77, 78; 359/449; 348/794, 348/782, 745
  See application file for complete search history.

(56) References Cited

U.S. PATENT DOCUMENTS

| 6,025,908 | A | 2/2000 | Houde-Walter | |
|---|---|---|---|---|
| 6,366,349 | B1 | 4/2002 | Houde-Walter | |
| 6,670,603 | B2 * | 12/2003 | Shimada et al. | 250/235 |
| 2006/0119800 | A1 * | 6/2006 | Burnett et al. | 353/69 |

FOREIGN PATENT DOCUMENTS

JP    2002328428 A2    11/2002

OTHER PUBLICATIONS

Laser Distancementer Model Disto Plus; http://www.geneq.com/catalog/en/disto_plus.html; printed from Internet Jul. 6, 2005; 3 pgs.
Laser Distancemeter Model Disto Classic 5; http://www.geneq.com/catalog/en/disto_classic.html; printed from Internet Jul. 6, 2005; 1 pg.
Laser Distancemeter Model Disto Lite 5; http://www.geneq.com/catalog/en/disto_lite.html; printed from Internet Jul. 6, 2005; 3 pgs.
Laser Distancemeter Model Disto; http://www.geneq.com/catalog/en/disto.html; printed from Internet Jul. 6, 2005; 3 pgs.
CST/Berger Leica Laser Distance Measuring Meter; http://www.mytoolstore.com/berger/disto.html; printed from Internet Jul. 6, 2005; 2 pgs.
Who Says You Can't Be Cutting-Edge And Tried And True? The Only All-Digital Display Solution, http://www.dlp.com/dlp_technology/dlp_technology_overview.asp?bhcp=1; printed from Internet Mar. 1, 2005; 4 pgs.
LOMO-Collimation Of Cassegrains And Hypergraphs, http://www.apm-telescopes.de/englisch/lomo/collmination.htm; printed from Internet Mar. 28, 2005; 4 pgs.
The Home Depot: Strait-Line 6041401CD 50 Foot Sonic Laser Tape, http://www.homedepot.com/prel80/HDUS/EN_US/diy_main/pg_diy.isp?CNTTYPE=PROD_ META &ProductOID=620391&CNTKEY=Products_2%2 FHand+Tools%2FMeasuring+Tapes%2FElectronic &pagetitle=Strait-Line+6041401CD+50+Foot+Sonic+Laser+Tape; printed from the Internet Jul. 14, 2005; 2 pgs.

\* cited by examiner (Continued)

*Primary Examiner*—William C. Dowling
(74) *Attorney, Agent, or Firm*—O'Keefe, Egan, Peterman & Enders LLP

(57) ABSTRACT

Systems and methods for adjusting a projection mirror of a rear projection device, that may be utilized to properly align an image projected by an image source within a desired projection area of the projection screen by adjusting the positional orientation of an image reflected by the adjustable projection mirror relative to a projection screen of the projection device based on one or more measured characteristics of light reflected by the projection mirror for projection onto the projection screen.

20 Claims, 8 Drawing Sheets

SYSTEMS AND METHODS FOR PROJECTION MIRROR ADJUSTMENT

BACKGROUND OF THE INVENTION

1. Field of the Invention

This invention relates generally to rear projection devices, and more particularly to adjustment of projection mirrors of rear projection devices.

2. Description of the Related Art

Rear projection devices, such as rear projection televisions, often employ integral projection mirrors for reflecting an image onto the rear projection surface of a translucent projection screen for viewing from the front side of the screen. In such devices, the image is generated by an image source, e.g., digital micromirror ("DMD")/digital light processing ("DLP™") device, liquid crystal on silicon ("LCoS") device, liquid crystal display ("LCD") device, cathode ray tube ("CRT") device, etc. The generated image is reflected from the image source onto the rear projection surface of the projection screen in sequential manner by two projection mirrors, i.e., reflected by a first mirror from the image source to a second mirror, and reflected from the second mirror to the projection screen. In such an projection device, the first mirror is typically adjustable to allow for post-manufacture alignment of the image generated by an image source with the projection screen. However, the adjustable projection mirror may become misaligned (e.g., tilted) during the shipping process when a rear projection device is shipped to an end customer, requiring professional installation and realignment of the adjustable projection mirror at the customer's end location.

SUMMARY OF THE INVENTION

Disclosed herein are systems and methods that may be employed to adjust a projection mirror of a rear projection device, e.g., to properly align an image projected by an image source with a desired projection area of the projection screen. The disclosed systems and methods may be advantageously implemented to determine and/or adjust the positional orientation of an image reflected by an adjustable projection mirror relative to a projection screen of a projection device based on one or more measured characteristics of light reflected by the projection mirror for projection onto the projection screen (e.g., light path length of the light reflected by said adjustable projection mirror for projection onto said rear surface of said projection screen, the presence of said projected light at a given point on the rear projection surface of the projection screen, etc.).

Where adjustment of mirror position is to be performed based on the measured characteristics of the projected light, one or more motors or other suitable actuators may be provided that are configured to re-position the projection mirror as necessary until the measured characteristics conform to pre-determined parameters. In one exemplary embodiment, an automatic image position adjustment algorithm may be implemented to so adjust a projection mirror (e.g., initiated by operator input, or automatically and/or dynamically initiated upon system start-up). Once adjustment is complete, the operator of the system (e.g., a customer or other end-user of the projection device) may be notified of the completion of the adjustment process. In this regard, the operator may be notified, for example, using an on-screen display on the system projection screen or any other suitable display device coupled to the system.

In one embodiment of the disclosed systems and methods, one or more photosensor devices may be employed to sense the presence of light reflected by an adjustable projection mirror through a fixed projection mirror onto the rear projection surface of a projection screen at the given location of each photosensor device, in order to indicate the positional orientation of an image reflected by the adjustable projection mirror through the fixed projection mirror relative to the projection screen. For example, in the case of a DMD/DLP™ image source device or other image source having capability of selectively activating single image pixels at a time, the adjustable projection mirror may be parked in a selected stationary position and each pixel of the image source may then be individually activated alone, i.e., one pixel activated at a time. During selective activation of individual pixels, each of the photosensors may be monitored to determine the identity of the pixel (e.g., the x-y pixel coordinates) of the pixel that is most aligned with the position of a photosensor at the selected stationary position of the adjustable projection mirror. This process may be repeated for additional photosensors that are positioned at differing locations of the rear projection surface of the projection screen and, if necessary, using different selected stationary positions of the adjustable mirror. The identity (e.g., x-y coordinates) of one or more pixels that are substantially aligned with one or more corresponding photosensors located on the rear projection surface of the projection screen may then be used to determine the position of the image reflected by the adjustable projection mirror relative to the projection screen, and/or to adjust the position of the image reflected by the adjustable projection mirror relative to the projection screen to achieve desired alignment of the projected image with the projection screen, e.g., using a motor or other actuator that is attached to the adjustable projection mirror.

In another embodiment of the disclosed systems and methods, the light path length between an image source (e.g., DMD/DLP™ device, LCoS device, LCD device, CRT device, etc.) and the rear projection surface of a projection screen of a rear projection device through an adjustable projection mirror and a fixed projection mirror may be measured, e.g., using at least one laser measurement device for an adjustable mirror having one axis of rotation, using at least three laser measurement devices for an adjustable mirror having two axes of rotation, etc. For example, in the case of a DMD/DLP™ image source device, a beam of laser light from a laser measurement device may be reflected from each of the four corner micro-mirrors on the DMD/DLP™ chip to each of the four corners of the rear projection surface of the projection screen via the projection mirrors, and the light path length between the image source and each of these four corners measured. Once the light path length data between image source and each of the four corners is measured, it may be compared to pre-determined light path length data stored in memory that corresponds to the light path length between the image source and each of the four corners, e.g., pre-determined light path length data that corresponds to an optimized projection mirror position determined based on the design of the system. The difference between the measured and pre-determined light path length data may then be used to determine the position of the image reflected by the adjustable projection mirror relative to the projection screen, and/or to adjust the position of the image reflected by the adjustable projection mirror relative to the projection screen. If adjustment of the adjustable mirror position is needed following laser measurement (i.e., the measured light path length data does not match the predetermined length data), a motor or other actuator that is attached to the projection mirror may be activated to reposition the adjustable mirror as necessary until the measured light path length data matches the pre-determined light path length data, e.g., within specified tolerances.

In one respect, disclosed herein is a rear projection device, including: an image source; a rear projection screen; an adjustable projection mirror; an actuator assembly physically coupled to the adjustable projection mirror; and one or more photosensors disposed on or adjacent the rear projection screen. The image source, the actuator assembly and the one or more photosensors may be configured to be electronically coupled to position correction and actuator control circuitry.

In another respect, disclosed herein is a rear projection device, including: an image source; a rear projection screen; an adjustable projection mirror; an actuator assembly physically coupled to the adjustable projection mirror; and at least one measurement light source configured to emit at least one measurement light beam that is reflected by the adjustable projection mirror for display on a surface of the rear projection screen. The measurement light source and the actuator assembly may be configured to be electronically coupled to position correction and actuator control circuitry.

In yet another respect, disclosed herein is a projection mirror adjustment method, including moving an adjustable projection mirror of a rear projection device based on one or more measured characteristics of light projected onto a rear surface of a projection screen of the rear projection device through the adjustable projection mirror.

DESCRIPTION OF ILLUSTRATIVE EMBODIMENTS

Figure 1A:
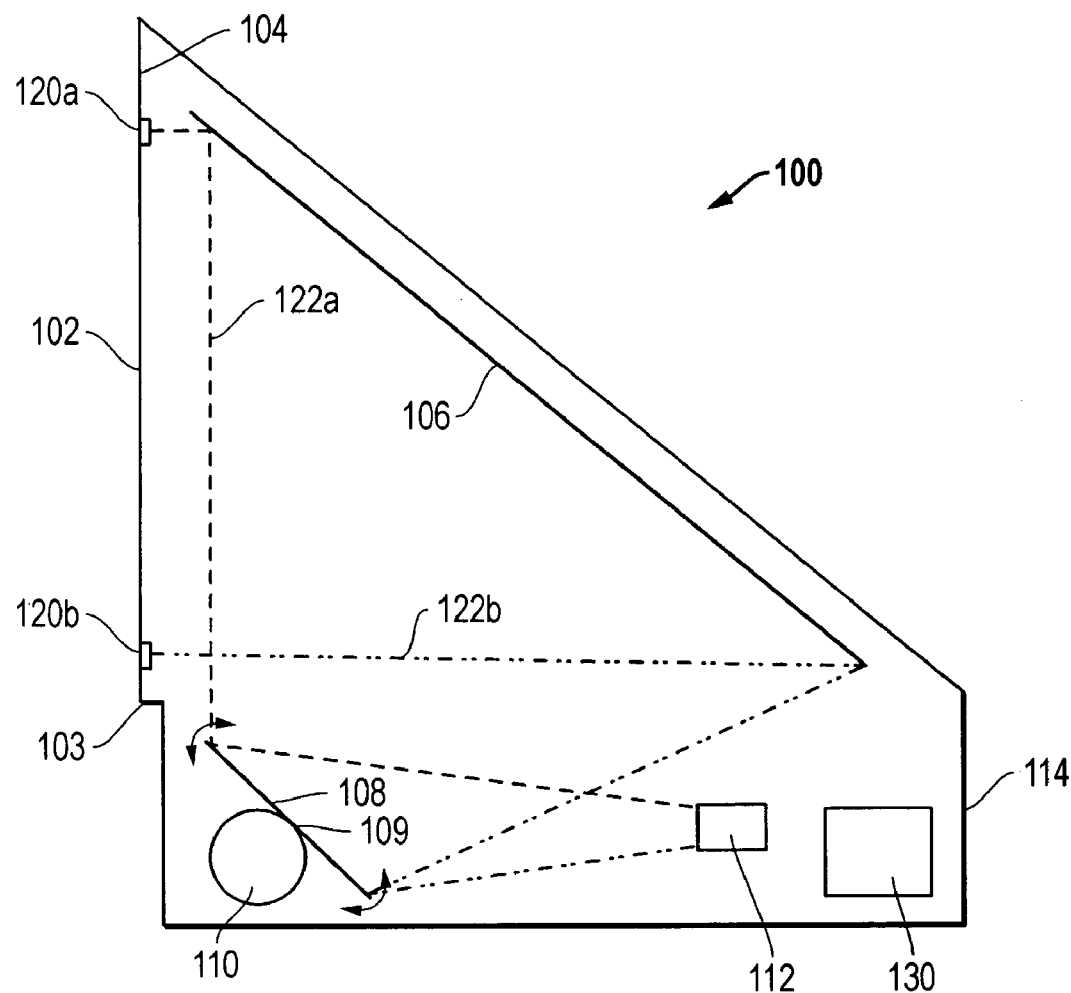
FIG. 1A is a simplified side cross sectional view of a rear projection device according to one embodiment of the disclosed systems and methods.

FIG. 1A is a simplified side cross sectional view of a rear projection device 100 according to one exemplary embodiment of the disclosed systems and methods. As shown, rear projection device 100 includes image source and projection components contained within a projection device housing 114. In particular, rear projection device 100 includes a projection screen assembly 103 having a rear projection surface 104 upon which an image is projected and a front surface through which the image is viewed. Rear projection device 100 may be a rear projection television device, or may be configured in the form of any other type of rear projection device, e.g., computer display device, movie theater display device, home theater device, etc. Rear projection device 100 may be configured as an information handling system having its own internal source of image data (e.g., computer/graphics software, firmware, hardware, etc.) and/or may be configured for coupling to receive image data for display from an external information handling system.

Figure 1B:
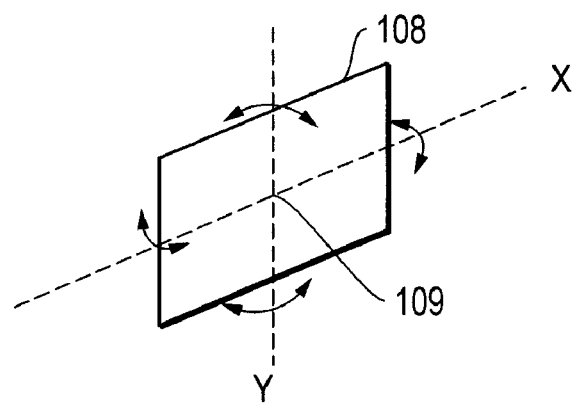
FIG. 1B is a simplified perspective view of an adjustable projection mirror according to one embodiment of the disclosed systems and methods.

Rear projection device 100 of FIG. 1A includes an image source 112 which produces an image for display upon rear projection surface 104 after reflection by adjustable projection mirror 108 and fixed projection mirror 106. As shown, an actuator assembly 110 (e.g., one or more stepper motors or other suitable actuator devices) may be coupled to move adjustable projection mirror 108 so as to the adjust position of the displayed image relative to rear projection screen surface 104. In one embodiment, actuator assembly 110 may be configured to rotate mirror 108 in two perpendicular axes so as to adjust the angle of the mirror. In FIG. 1A, actuator assembly 110 is coupled to rotate the reflective surface of mirror 108 about a center point 109 of mirror 108 in a vertical "Y" axis direction (shown by the arrows in FIG. 1A) and in a horizontal "X" axis direction (toward and away from the page). FIG. 1B further illustrates range of movement of mirror 108 throughout angles in the X and Y directions.

In the embodiment of FIG. 1A, image source 112 may be any type of image source suitable for generating a light image for projection and display on projection screen assembly 103 that is capable of selectively activating single image pixels at a time so that individual pixels of the image source may be activated alone, i.e., one pixel activated at a time. Examples of suitable image devices include, but are not limited to, microdisplay image sources such as digital micromirror ("DMD")/digital light processing ("DLP™") devices, liquid crystal on silicon ("LCoS") devices, liquid crystal display ("LCD") devices, etc.

Figure 2:
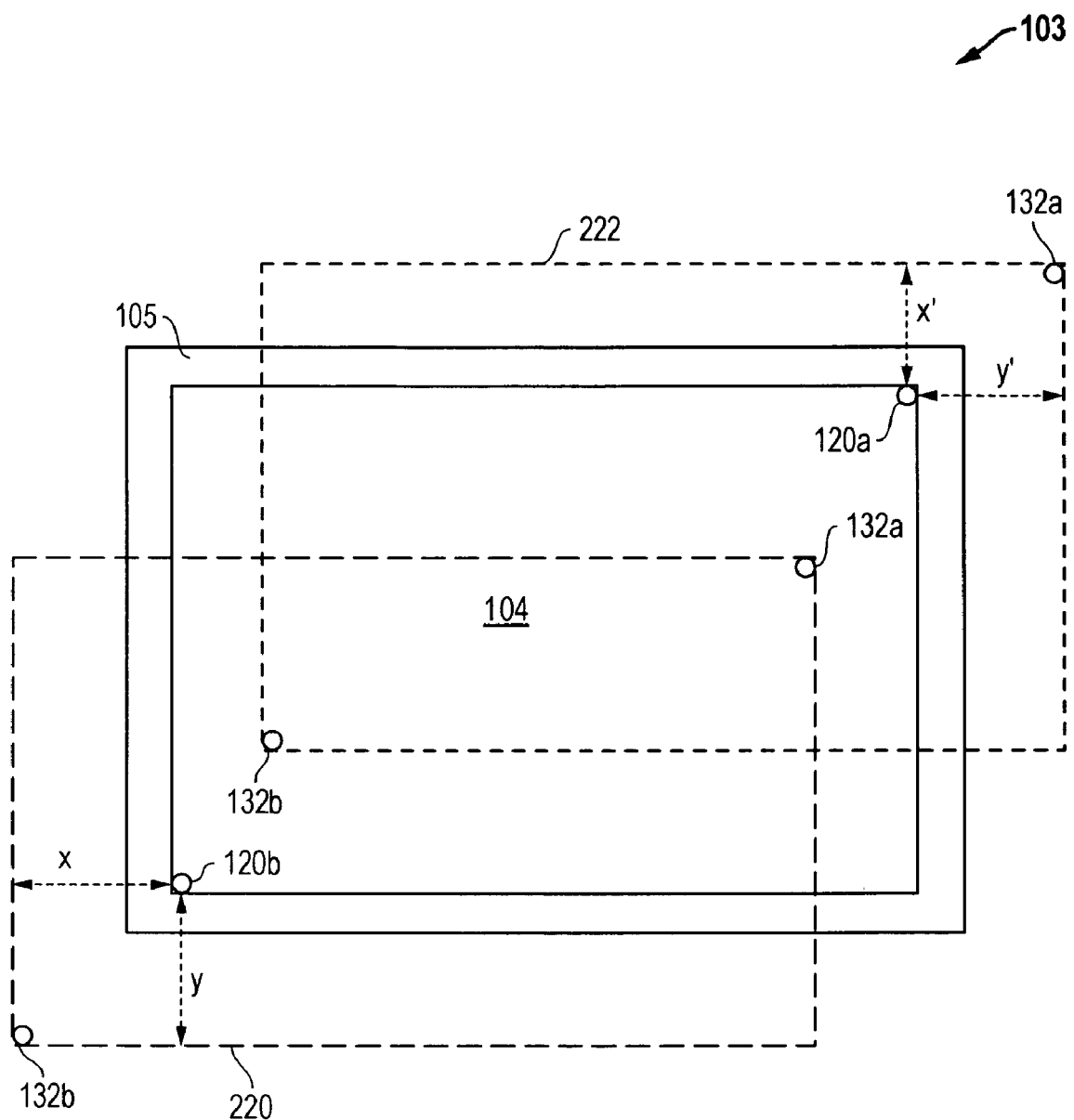
FIG. 2 is a back side view of a projection screen surface according to one embodiment of the disclosed systems and methods.

Still referring to the exemplary embodiment of FIG. 1A, rear projection device 100 also includes photosensor devices 120a and 120b that are diagonally disposed in two opposite corners of rear projection surface 104 of projection screen 103. FIG. 2 illustrates the back side of projection screen assembly 103, and shows photosensor devices 120a and 120b as they may be disposed at upper right hand corner and at lower left hand corner of rear projection surface 104 of projection screen assembly 103. In this embodiment, a margin 105 exists between the outer boundaries of projection screen assembly 103 and the rear projection surface 104 upon which an image is to be displayed. In FIG. 1A, adjustable mirror 108 is shown properly aligned and positioned such that the light beam 122a (shown in short-dashed line) projected by the upper left hand pixel of the front surface of image source 112 is projected onto the position of the upper right hand photosensor 120a, and such that the light beam 122b (shown in long-dashed line) projected by the lower right hand pixel of the front surface of image source 112 is projected onto the position of the lower left hand photosensor 120b. However, if the image reflected by adjustable mirror 108 is not properly aligned relative to projection screen assembly 103, then light beams 122a and 122b will not be projected onto corresponding photo sensors 120a and 120b in the manner shown. In such circumstances, the position of adjustable projection mirror 108 may be adjusted in a manner as described further below.

Also shown present in the embodiment of FIG. 1A is optional position correction and actuator control circuitry 130 that may be provided to perform adjustable mirror position detection and to control movement of actuator assembly 110 to move adjustable projection mirror 108 and adjust the position of the projected image of image source 112. One embodiment of circuitry 130 is shown illustrated in FIG. 3 relation to other components of rear projection device 100. However, it will be understood that one or more position detection and/or mirror movement control tasks may be performed using any other suitable configuration of circuitry internal and/or external to rear projection device 100, e.g., by an external portable or desktop information handling system (not shown) coupled to rear projection device 100.

Figure 3:
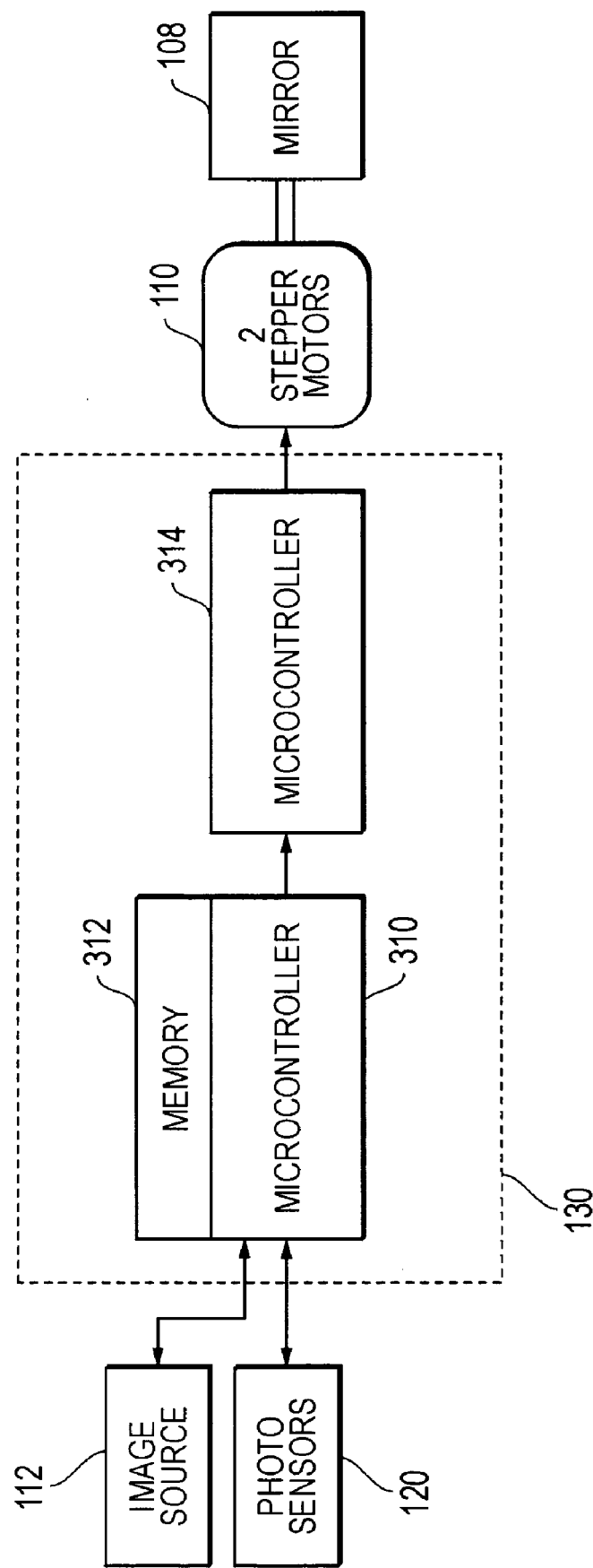
FIG. 3 is a simplified block diagram of position correction and actuator control circuitry according to one embodiment of the disclosed systems and methods.

Referring now to the exemplary embodiment of FIG. 3, position correction and actuator control circuitry 130 of FIG. 1A is coupled to control image source 112 and to receive data from photosensors 120. Circuitry 130 is also coupled to control actuators 110 of FIG. 1A which are mechanically coupled to rotate or otherwise move adjustable mirror 108. As shown in FIG. 3, circuitry 130 includes a first microcontroller 310 (e.g., Freescale MC9508GT60, National Semiconductor COP89AB7SLB9TRND, etc.) and associated memory 312 (e.g., built-in microcontroller memory), and a second microcontroller 314. In this embodiment, first microcontroller 310 is coupled to receive data from each of photosensors 120 and to execute a suitable image position adjustment algorithm, e.g., such as described further herein in relation to FIG. 4. Memory 312 may be present for storage of one or more parameters (e.g., x-y pixel coordinates, etc.) utilized by the image adjustment algorithm. Second microcontroller 314 (e.g., PIC® Microcontroller from Multichip Technology, etc.) may be present for providing actuation control signals to actuators 110 based on actuator adjustment information received from first microcontroller 310.

Figure 4:
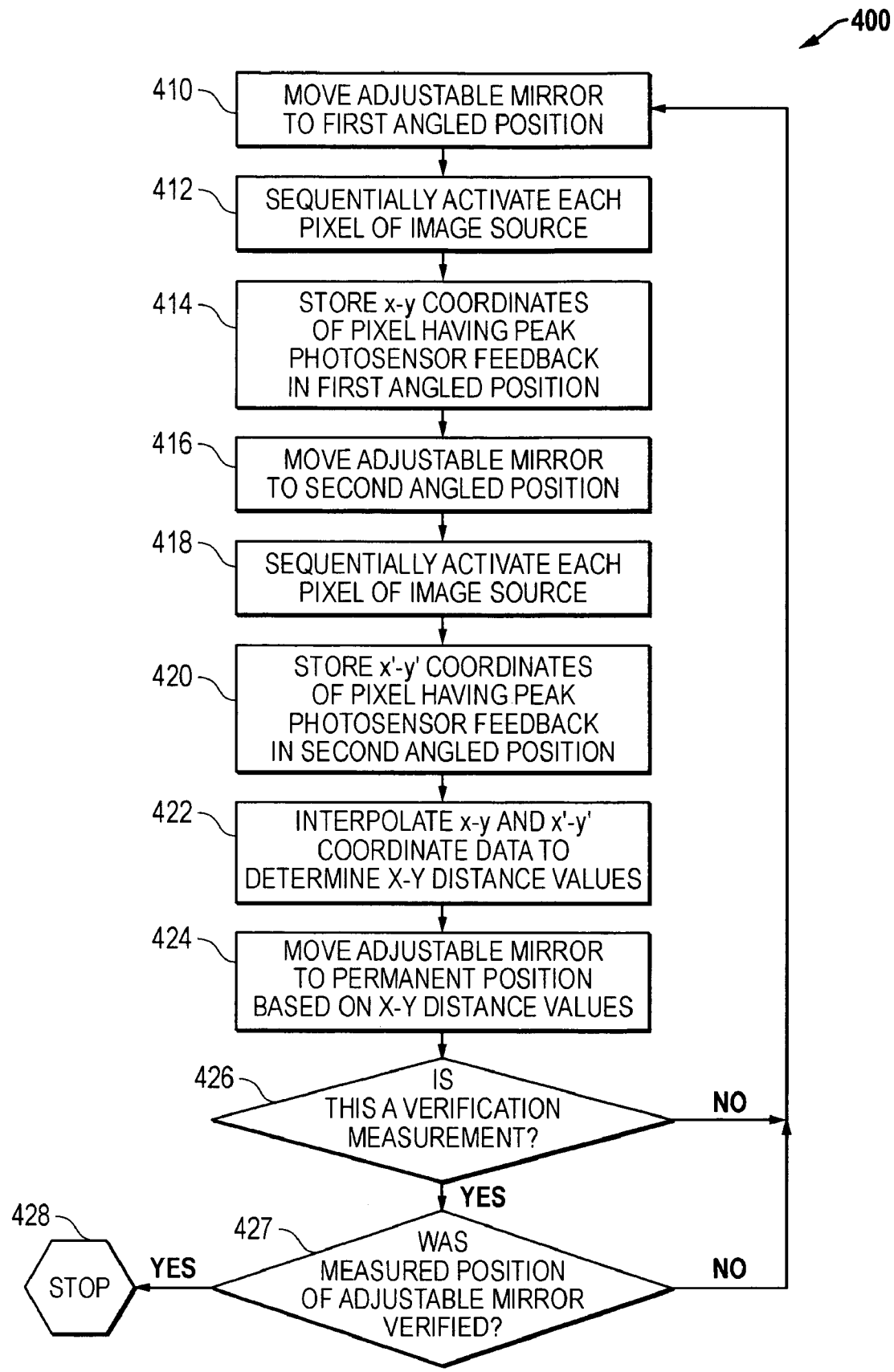
FIG. 4 is an image position adjustment algorithm according to one embodiment of the disclosed systems and methods.

FIG. 4 illustrates one exemplary embodiment of an image position adjustment algorithm 400 as it may be practiced using the disclosed systems and methods. Algorithm 400 may be implemented, for example, with rear projection device 100 of FIG. 1A to adjust the position of an image reflected by adjustable mirror 108 onto rear projection screen surface 104 via fixed mirror 106. As shown in FIG. 4, algorithm 400 begins in step 410 where actuators 110 are used (e.g., controlled by second microcontroller 314 based on information received from first microcontroller 310 of FIG. 3) to move adjustable mirror 108 to a first angled position, e.g., in this case angled downward as if to reflect an image toward the lower left hand corner of rear projection surface 104 of projection screen assembly 103 where photosensor 120b is positioned. The outer pixel array boundary of such an image is indicated in FIG. 2 by long-dashed outline 220, it being understood that dashed outline 220 is only a representation shown to illustrate the positioning of adjustable mirror 108, and that no actual entire image need be so displayed. Actuators 110 may be parked in step 410 so as to lock adjustable mirror 108 into this first secure position prior to proceeding further.

Next, in step 412, individual pixels of the microdisplay image source 112 are activated (e.g., in sequential or any other suitable manner) until a peak light response is detected at photosensor 120b from one of the activated individual pixels. The identity of this individual pixel (e.g., identity in x-y pixel coordinates measured from coordinates of corner pixel 132b of the pixel array boundary as shown in FIG. 2) is then stored in memory in step 414. To implement step 412 for DMD/DLP™ chip light sources, the light engine of the image source may be turned on and each pixel of the DMD/DLP™ chip individually activated to produce a single pixel beam of white light that is reflected off projection mirrors 108 and 106 to rear projection screen surface 104. A similar pixel-by-pixel methodology may be employed with other types of image sources, such as LCoS or LCD light sources, to produce white light from individual pixels of the image source. Activation of individual pixels may be controlled, for example, by first microcontroller 310 of FIG. 3. It will be understood that reference (e.g., default) coordinates for corner pixels 132a and 132b may be maintained in memory for use in calculation of x-y pixel coordinates and x'-y' pixel coordinates, as described above and below. Examples of such default coordinates would be (0,0) for a first corner pixel and (1280, 720) for a second corner pixel positioned diagonally opposite the first corner pixel in a 1280×720 pixel array.

Following completion of step 414, actuators 110 are used (e.g., controlled by second microcontroller 314 based on information received from first microcontroller 310 of FIG. 3) to move adjustable mirror 108 to a second angled position, i.e., in this case angled upward as if to reflect an image toward the upper right hand corner of rear projection surface 104 of projection screen assembly 103 where photosensor 120a is positioned. The outer pixel array boundary of such an image is indicated in FIG. 2 by short-dashed outline 222, it being understood that dashed outline 220 is only a representation shown to illustrate the positioning of adjustable mirror 108, and that no actual entire image need be so displayed. Actuators 110 may be parked in step 416 so as to lock adjustable mirror 108 into this second secure position prior to proceeding further. In a manner similar to that of step 412, individual pixels of the microdisplay image source 112 are activated until a peak light response is detected at photosensor 120a from one of the activated individual pixels. The identity of this individual pixel (e.g., in x'-y' pixel coordinates measured from corner pixel 132b of the pixel array boundary 222 as shown in FIG. 2) is then stored in memory in step 420. Once again, activation of individual pixels may be controlled, for example, by microcontroller 310 of FIG. 3.

Next, in step 422, x-y distance values X and Y required to move adjustable mirror 108 are determined (e.g., calculated by first microcontroller 310 of FIG. 3) from the measured x-y pixel coordinates of step 414 and the measured x'-y' pixel coordinates of step 420 so that light emitted by corner pixel 132a is substantially aligned with photosensor 120a, and so that light emitted by corner pixel 132b is substantially aligned with photosensor 120b. One exemplary embodiment of a formula that may be employed to determine X and Y distance values by interpolation from the measured x-y and measured x'-y' values may be expressed as follows (although any other suitable methodology may be employed for calculating lengths for adjustable mirror 108 so that light emitted from corner pixels 132a and 132b are aligned with photosensors 120a and 120b, respectively):

$$X=(x+x')/2$$

$$Y=(y+y')/2$$

Once distance values X and Y have been determined in step 422, actuators 110 are used in step 424 (e.g., controlled by second microcontroller 314 based on information received from first microcontroller 310 of FIG. 3) to move adjustable projection mirror 108 accordingly (e.g., by calculated coordinate distance X and calculated coordinate distance Y) to a permanent position representing the desired alignment position of image projected by image source 112 onto rear surface 104 of projection screen 103, e.g., where light emitted from corner pixels 132a and 132b are aligned with photosensors 120a and 120b, respectively. By moving adjustable mirror 108 to such a position, the entire image produced by the image source pixel array may be properly aligned with rear projection surface 104 of projection screen assembly 103, and any angular skew in the projected image relative to the rear projection surface 104 may be substantially eliminated. Once step 422 is completed, the entire process may be optionally repeated as shown in steps 426 and 427 to verify that the distance values X and Y are values that result in optimal placement (e.g., angular orientation) of adjustable projection mirror 108. After verification of position, the process may be terminated in step 428, and the operator of the projection device optionally notified via on-screen display or other suitable method as previously described.

It will be understood that the algorithm of FIG. 4 is exemplary only, and that any other image position adjustment methodology may be implemented that is suitable for positioning an adjustable projection mirror based on detection of light from an individual pixel at one or more photosensors disposed on or adjacent a projection screen of a rear projection device. In this regard, the algorithm of FIG. 4 may be implemented with additional or fewer steps, or other combinations thereof. Furthermore, it will be understood that the one or more photosensors (e.g., three photosensors, four photosensors, etc.) may be disposed in any position suitable for detecting light from an individual pixel of an image source pixel array that is reflected by an adjustable projection mirror so that the identity (e.g., x-y coordinate position) of the detected individual pixel may be determined relative to the entire pixel array at a given position of the adjustable projection mirror, and so that a new position of the adjustable mirror may be determined that results in a desired positioning of an image produced by the image source pixel array relative to the projection screen. In this regard, photosensors may be located anywhere suitable for detecting light emitted by individual pixels, e.g., on a front surface of a projection screen, in the margin surrounding the outside boundary of the projection surface, anywhere within the projection surface area, combinations thereof, etc. It will be understood that the minimum number of photosensors required for a given application is determined by the number of axes of rotation of a given adjustable mirror employed in the given application. In one exemplary embodiment, at least one photosensor may be employed for positioning an adjustable projection mirror having only one axis of rotation (e.g., X-axis only or Y-axis only), and at least two photosensors may be employed for positioning an adjustable projection mirror having two axes of rotation (e.g., having both X and Y axes of rotation).

Figure 5:
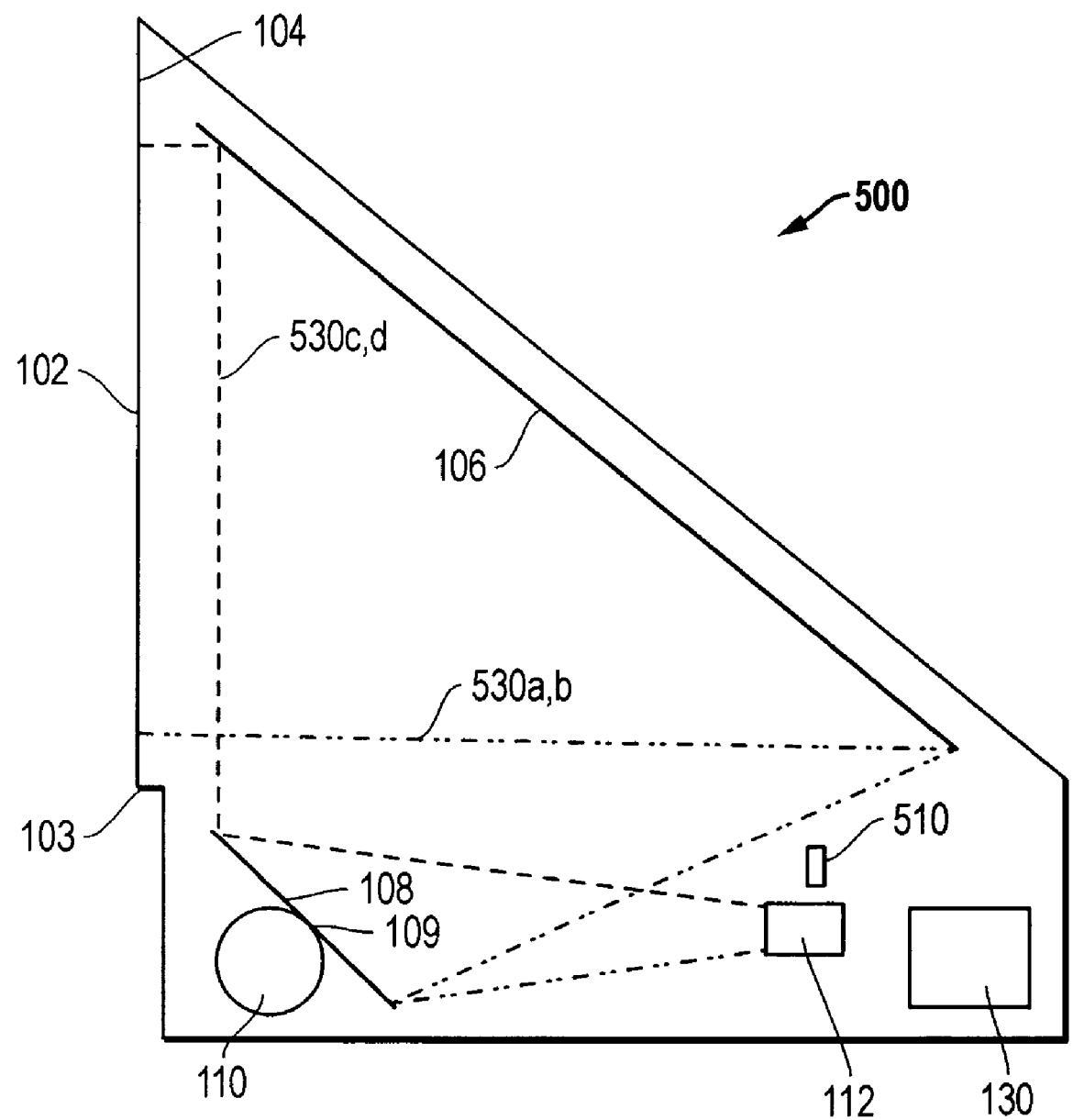
FIG. 5 is a simplified side cross sectional view of a rear projection device according to one embodiment of the disclosed systems and methods.

FIG. 5 is a simplified side cross sectional view of a rear projection device 500 configured according to another exemplary embodiment of the disclosed systems and methods. Rear projection device 500 includes a projection screen assembly 103 having a rear projection surface 104 upon which an image is projected and a front surface through which the image is viewed, and may be configured in the form of any type of rear projection device such as described in relation to rear projection device 100. Similar to rear projection device 100 of FIG. 1A, rear projection device 500 includes an image source 112 which produces an image for display upon rear projection surface 104 after reflection by adjustable projection mirror 108 and fixed projection mirror 106, and an actuator assembly 110 coupled to move adjustable projection mirror 108.

Still referring to the exemplary embodiment of FIG. 5, rear projection device 100 also includes a measurement light source 510 (e.g., laser diode module) that is configured to emit four individual measurement light beams (e.g., laser beams or other type of light suitable for measuring length) 530a, 530b, 530c, and 530d corresponding to each of four corner pixel positions of image source 112, and that are reflected by adjustable projection mirror 108 and fixed projection mirror 106 to four separate positions on projection screen assembly 103 (e.g., to each of four corners of rear surface 104 of projection screen 103 when adjustable mirror 108 is properly aligned). In this regard, measurement light source 510 may be configured to directly transmit measurement light beams 530 to adjustable projection mirror 108 (e.g., in case of LCoS, LCD or CRT image source 112), or may be configured to transmit measurement light beams 530 to each corner pixel of a DMD/DLP™ image source chip for reflection to adjustable projection mirror 108.

In one exemplary embodiment, a measurement light source 510 may be a laser diode module capable of measuring the distance between the laser diode module and a surface upon which a laser light beam is projected by the laser diode module. Examples of laser light measurement systems employing such laser diode modules include, but are not limited to, CST/Berger Leica 56-DISTOC Laser Distance Meter, DISTO Lite 5, DISTO Classic 5, DISTO Classic 5a, DISTO Plus, etc.

In one embodiment, a laser diode module in combination with microcontroller 310 may be employed to measure light path distance (d) to and back from a given position on projection screen assembly 103. In this regard, microcontroller 310 may calculate the two-way distance (d) to and back from the given position on projection screen assembly 103 by calculating the time (t) it takes for an emitted measurement laser light beam to travel to the given position on projection screen assembly 103 and back to the measurement light source 510 at a given speed (s) of the measurement light beam, e.g., d=t×s, or d is equal to the product of measured time (t) and speed (s). It will be understood that any other value based on light path distance may be measured or calculated, e.g., d=(t×s)/2, or d is equal to the product of measured time (t) and speed (s) divided by two.

Figure 6:
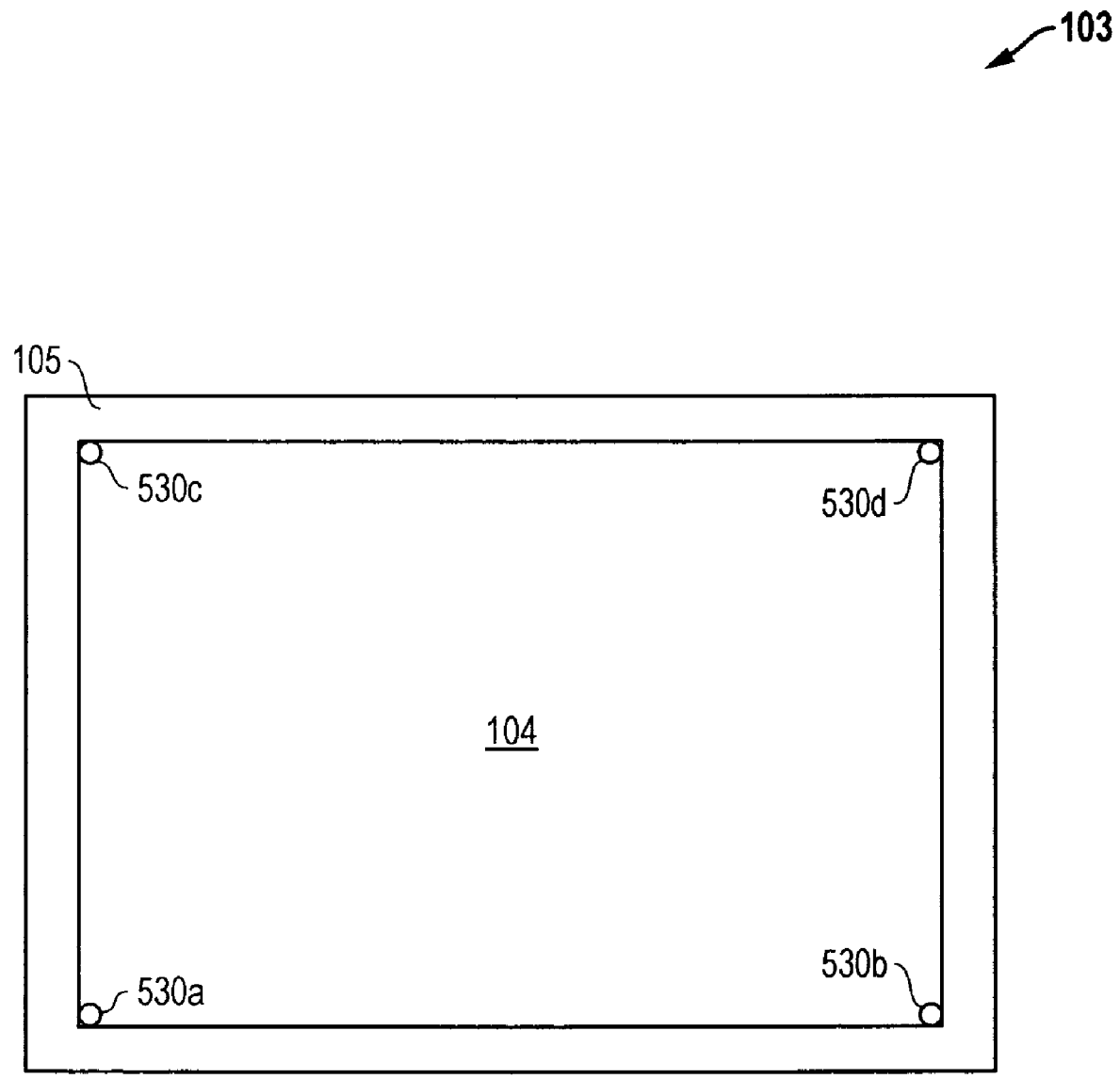
FIG. 6 is a back side view of a projection screen surface according to one embodiment of the disclosed systems and methods.

FIG. 6 illustrates the back side of projection screen assembly 103, and shows exemplary measurement light beams (e.g., laser beams) 530a, 530b, 530c, and 530d as they may be projected in one embodiment onto four separate positions on projection screen assembly 103 (e.g., to each of four corners of rear surface 104 of projection screen 103 when adjustable mirror 108 is properly aligned), it being understood that the projected position of projected measurement light beams (e.g., laser beams) 530a, 530b, 530c, and 530d will be different for different positions of adjustable mirror 108. Furthermore, it will be understood that measurement light beams may be projected that correspond to any combination of two or more separate pixel positions of image source 112 that is suitable for allowing determination and/or adjustment of position of adjustable projection mirror 108 in a manner as described further herein.

Returning to FIG. 5, optional position correction and actuator control circuitry 130 may be provided as shown to perform adjustable mirror position detection, and to control movement of actuator assembly 110 to move adjustable projection mirror 108 and adjust the position of the projected image of image source 112. One embodiment of circuitry 130 is shown illustrated in FIG. 7 relation to other components of rear projection device 500. However, it will be understood that one or more position detection and/or mirror movement control tasks may be performed using any other suitable configuration of circuitry internal and/or external to rear projection device 500, e.g., by an external portable or desktop information handling system (not shown) coupled to rear projection device 100.

Figure 7:
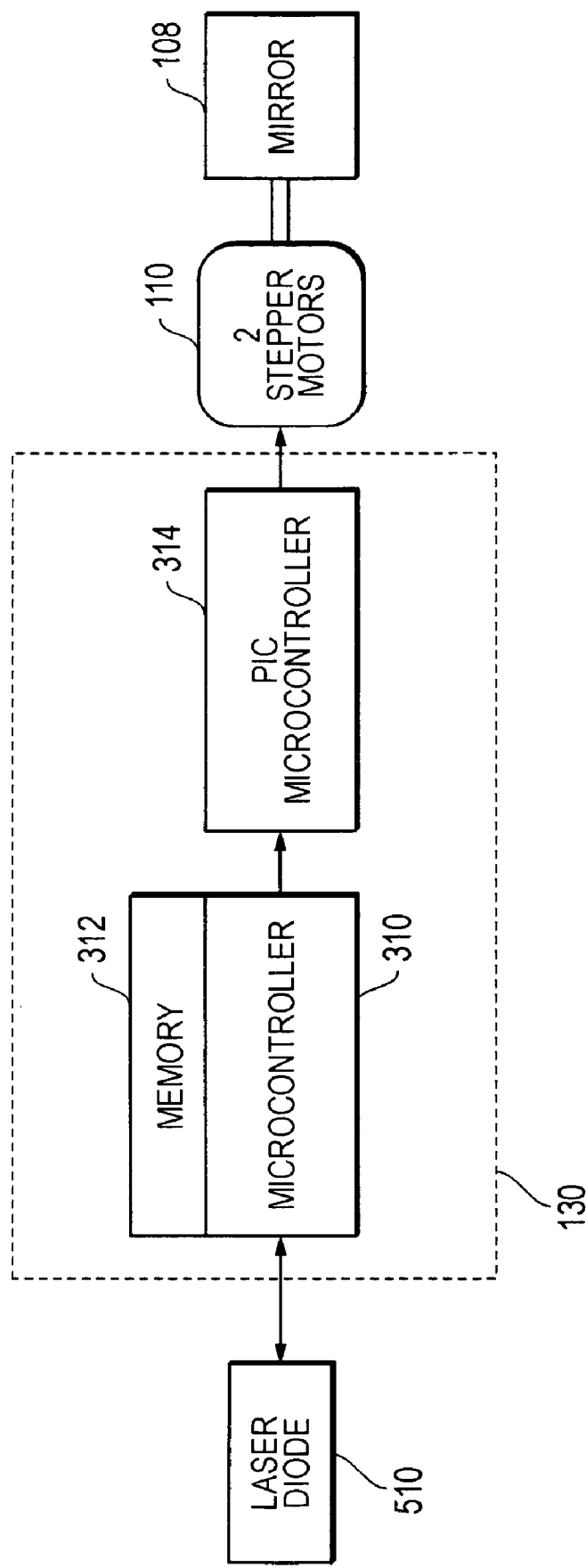
FIG. 7 is a simplified block diagram of position correction and actuator control circuitry according to one embodiment of the disclosed systems and methods.

Referring now to the exemplary embodiment of FIG. 7, position correction and actuator control circuitry 130 of FIG. 1A is coupled to control measurement light source 510 and to determine length of light paths traveled by measurement light beams 530. Circuitry 530 is also coupled to control actuators 110 of FIG. 5 which are mechanically coupled to rotate or otherwise move adjustable mirror 108. Similar to the embodiment of FIG. 3, circuitry 530 includes a first microcontroller 310 and associated memory 312, and a second microcontroller 314. In this embodiment, first microcontroller 310 is coupled to control measurement light source 510 and to execute a suitable image position adjustment algorithm, e.g., such as described further herein in relation to FIG. 8. As in the embodiment of FIG. 3, memory 312 may be present for storage of one or more parameters utilized by the image adjustment algorithm, and second microcontroller 314 may be present for providing actuation control signals to actuators 110 based on actuator adjustment information received from first microcontroller 310.

Figure 8:
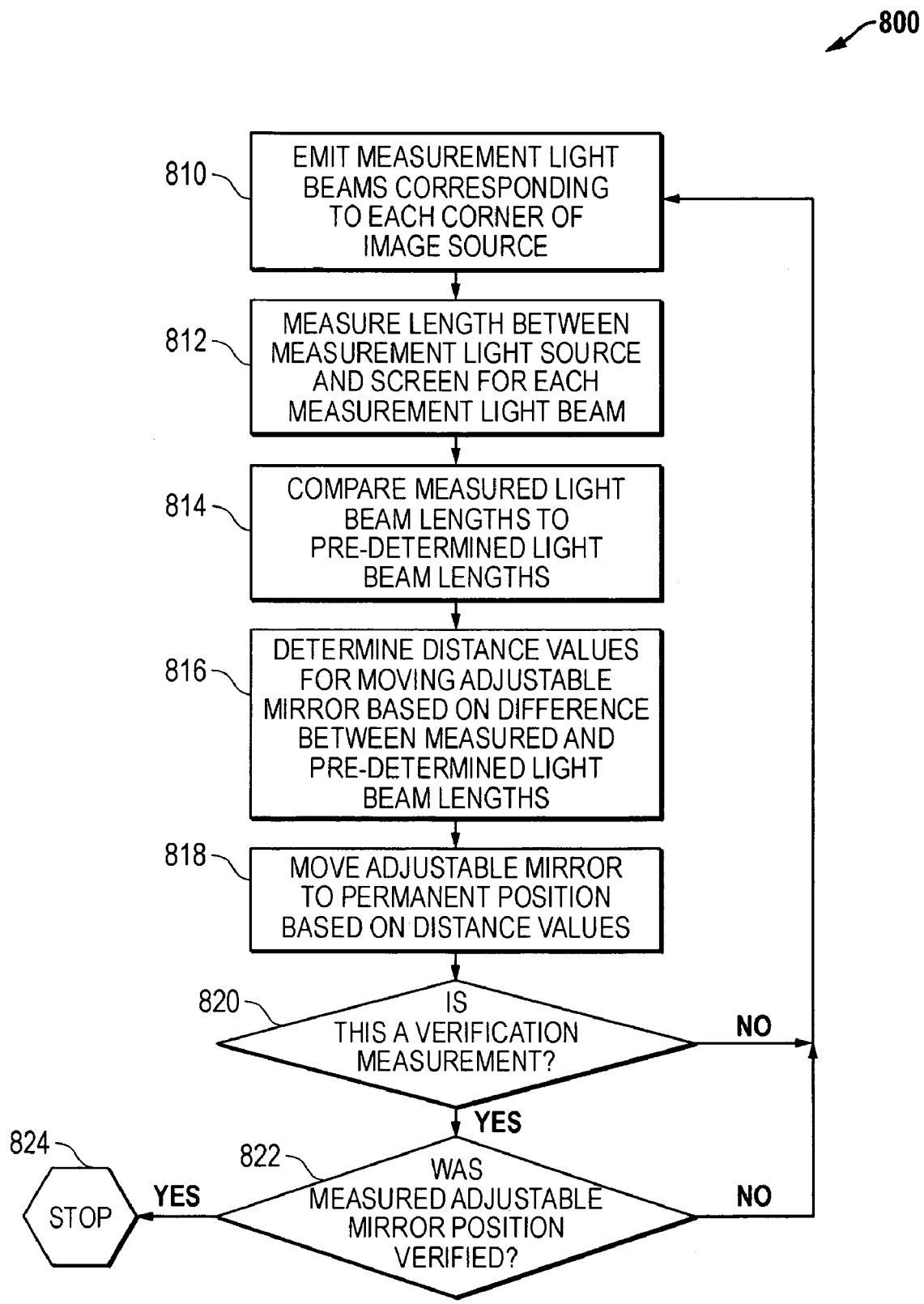
FIG. 8 is an image position adjustment algorithm according to one embodiment of the disclosed systems and methods.

FIG. 8 illustrates one exemplary embodiment of an image position adjustment algorithm 800 as it may be practiced using the disclosed systems and methods. Algorithm 800 may be implemented, for example, with rear projection device 500 of FIG. 5 to adjust the position of an image reflected by adjustable mirror 108 onto rear projection screen surface 104 via fixed mirror 106. As shown in FIG. 8, algorithm 800 begins in step 810 where measurement light source 510 (e.g., laser diode module) emits a measurement light beam corresponding to each corner pixel of image source 112 (e.g., emitted to each corner pixel of a DMD/ DLP™ chip mirror image source) and that travels to a corresponding respective corner of rear projection surface 104 of projection screen 103 (e.g., four measurement light spots projected on rear surface 104 of screen 103, one on each corner), before being reflected back via the same light path to the laser measurement light source 510. All four measurement light beams may be emitted simultaneously or sequentially (i.e., for sequential measurement). In one embodiment, first microcontroller 310 may be employed to control emission of measurement light beams from measurement light source 510.

Next, in step 812, a measurement light beam value corresponding to the distance between the source of each measurement light beam and a surface of projection screen 103 is measured. This may done for example, by using first microcontroller 310 to measure the time difference between each measurement light beam emitted time and the time it is reflected back to the source of the measurement light beam from a surface of projection screen 103, i.e., the difference in time is proportional to the light path length between the source of each measurement light beam and its respective point of display on a rear surface of projection screen 103 and back to the source of the measurement light beam. In the illustrated embodiment of FIG. 8, the measured light path length between the source of each given measurement light beam to and from a rear surface of projection screen 103 is then compared in step 814 to a respective pre-determined (known) light path length for a properly aligned adjustable projection mirror 108 that corresponds to the given measurement light beam. This may be done, for example, by using first microcontroller 310 of circuitry 130 to compare each of the measured measurement light beam values (e.g., in the form of measurement light beam lengths) to a corresponding pre-determined light beam value (e.g., in the form of a pre-determined light beam length) that is calibrated and preprogrammed in the factory for a properly aligned adjustable mirror 108 and stored in memory 312 of circuitry 130. It will be understood that a measurement light beam value may be a measured time value or any other measured value that is proportional to the distance between the source of each measurement light beam and its respective point of display on a rear surface of projection screen 103 and that it may be compared to a corresponding pre-determined (known) light beam value for a properly aligned adjustable projection mirror 108 that is stored in memory.

Next, in step 816, distance values required to move each corner of adjustable mirror 108 are determined (e.g., calculated by first microcontroller 310 of FIG. 7) based on the differences between the measured light beam values (e.g., in the form of measured light beam lengths) and the respective pre-determined (known) light beam values (e.g., in the form of pre-determined light beam lengths) calculated in step 814 so that light emitted by each corner pixel of image source 112 is substantially aligned with respective corners of rear projection surface 104 of projection screen 103 or in any other desired alignment position, e.g., so that measured measurement light beam values are substantially equal to the pre-determined measurement light beam values. In one exemplary embodiment, distance values required to move each corner of adjustable mirror 108 may be determined based on the subtracted difference between each of the measured light beam lengths and the corresponding pre-determined (known) light beam length.

Once distance values have been determined in step 816, actuators 110 are used in step 818 (e.g., controlled by second microcontroller 314 based on information received from first microcontroller 310 of FIG. 7) to move adjustable projection mirror 108 accordingly to a permanent position representing the desired alignment position of image projected by image source 112 onto rear surface 104 of projection screen 103. Once step 818 is completed, the entire process may be optionally repeated as shown in steps 820 and 822 to verify that the distance values are values that result in optimal or desired placement (e.g., angular orientation) of adjustable projection mirror 108. After verification of position, the process may be terminated in step 824, and the operator of the projection device optionally notified via on-screen display or other suitable method as previously described.

As an example of one exemplary embodiment of the above process, if a first corner has a measured light beam length of 63" compared to a pre-determined (known) light beam length of 62" stored in memory for the first corner of the adjustable mirror, then the first corner of the adjustable mirror is moved so that the length is 62" and the position of the first corner of the adjustable mirror then held in place during the following measurements at other corners. A similar process may then be repeated for second and third corners of the adjustable mirror. The process may be optionally repeated for a fourth corner of the adjustable mirror, although this is not necessary. Simultaneous adjustments of the corners is also possible.

It will be understood that the algorithm of FIG. 8 is exemplary only, and that any other image position adjustment methodology may be implemented that is suitable for positioning an adjustable projection mirror based on difference between measured and respective pre-determined measurement light beam values. In this regard, the algorithm of FIG. 8 may be implemented with additional or fewer steps, or other combinations thereof.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A rear projection device, comprising:
    an image source;
    a rear projection screen;
    an adjustable projection mirror;
    an actuator assembly physically coupled to said adjustable projection mirror; and
    one or more photosensors disposed on or adjacent said rear projection screen;
    wherein said image source, said actuator assembly and said one or more photosensors are configured to be electronically coupled to position correction and actuator control circuitry.

2. The rear projection device of claim 1, wherein said rear projection device further comprises said position correction and actuator control circuitry, said position correction and actuator control circuitry begin electronically coupled to said image source, said actuator assembly and said one or more photosensors.

3. The rear projection device of claim 2, wherein said image source comprises an array of image pixels, each of said image pixels being capable of selective activation; wherein said adjustable projection mirror is configured to reflect light emitted by said image pixels of said image pixel array for display on a rear surface of said rear projection screen; and wherein said one or more photosensors are disposed adjacent said rear projection screen, each of said one or more photosensors being in position to detect light emitted by an individual image pixel of said pixel array that is reflected by said adjustable projection mirror.

4. The rear projection device of claim 3, wherein said rear projection screen has a rectangular-shaped rear projection surface configured to display a rectangular-shaped image produced by said image source; and wherein said one or more photosensors comprise two photosensors disposed on opposite corners of said rectangular-shaped rear projection surface.

5. The rear projection device of claim 3, further comprising a fixed projection mirror configured to reflect light from said adjustable projection mirror onto said rear surface of said rear projection screen.

6. The rear projection device of claim 3, wherein said position correction and actuator control circuitry is configured to:
    control said actuator assembly to position said adjustable projection mirror in a first known position;
    control said image source to selectively activate individual image pixels of said image pixel array one image pixel at a time while said adjustable projection mirror is in its first known position;
    communicate with said one or more photosensors to sense the presence of said beam of light produced by a first one of said activated individual image pixels and reflected by said adjustable projection mirror while in its first known position through a fixed projection mirror of said rear projection device onto said rear surface of said rear projection screen;
    control said actuator assembly to position said adjustable projection mirror in a second known position;
    control said image source to selectively activate individual image pixels of said image pixel array one image pixel at a time while said adjustable projection mirror is in its second known position;
    communicate with said one or more photosensors to sense the presence of said beam of light produced by a second one of said activated individual image pixels and reflected by said adjustable projection mirror while in its first known position through said fixed projection mirror of said rear projection device onto said rear surface of said rear projection screen;
    determine a third position for said adjustable projection mirror based on the identity of said first activated image pixel relative to said first position of said adjustable mirror in combination with the identity of said second activated image pixel relative to said second position of said adjustable mirror; and
    control said actuator assembly to position said adjustable projection mirror in said third position.

7. The rear projection device of claim 1, wherein said position correction and actuator control circuitry is configured to execute an automatic image position adjustment algorithm.

8. A rear projection device, comprising:
    an image source;
    a rear projection screen;
    an adjustable projection mirror;
    an actuator assembly physically coupled to said adjustable projection mirror; and
    at least one measurement light source configured to emit at least one measurement light beam that is reflected by said adjustable projection mirror for display on a surface of said rear projection screen;

wherein said measurement light source and said actuator assembly are configured to be electronically coupled to position correction and actuator control circuitry.

9. The rear projection device of claim 8, wherein said rear projection device further comprises said position correction and actuator control circuitry, said position correction and actuator control circuitry begin electronically coupled to said measurement light source and said actuator assembly.

10. The rear projection device of claim 9, wherein said image source comprises a DMD/DLP™ image source; and wherein said measurement light source is configured to emit a measurement light beam to at least one of said pixels of said DMD/DLP™ image source chip for reflection to said adjustable projection mirror, said adjustable projection mirror reflecting said measurement light beam for display on said rear projection screen.

11. The rear projection device of claim 10, wherein said DMD/DLP™ image source comprises four corner pixels; wherein said at least one measurement light source comprises at least three laser diodes configured to emit a measurement light beam to each of three corner pixels of said four corner pixels of said DMD/DLP™ image source chip for reflection to said adjustable projection mirror, said adjustable projection mirror reflecting said at least three measurement light beams for display on said rear projection screen.

12. The rear projection device of claim 10, further comprising a fixed projection mirror configured to reflect said measurement light beam from said adjustable projection mirror onto a rear surface of said rear projection screen.

13. The rear projection device of claim 9, wherein said position correction and actuator control circuitry is configured to:
control said measurement light source to emit said measurement light beam while said adjustable projection mirror is in a first position;
measure a length of said measurement light beam that is reflected by said adjustable projection mirror while in said first position for display on a surface of said rear projection screen;
compare said measured measurement light beam value to a pre-determined light beam length to determine a difference between said measurement light beam value and said pre-determined light beam length;
determine a second position for said adjustable projection mirror based on said difference between said measurement light beam value and said pre-determined light beam length; and
control said actuator assembly to position said adjustable projection mirror in said second position.

14. The rear projection device of claim 8, wherein said position correction and actuator control circuitry is configured to execute an automatic image position adjustment algorithm.

15. A projection mirror adjustment method, comprising moving an adjustable projection mirror of a rear projection device based on one or more measured characteristics of light projected onto a rear surface of a projection screen of said rear projection device through said adjustable projection mirror.

16. The method of claim 15, wherein said one or more measured characteristics comprise at least one of the light path length of said light reflected by said adjustable projection mirror for projection onto said rear surface of said projection screen, the presence of said projected light at a given point on the rear projection surface of the projection screen, or a combination thereof.

17. The method of claim 15, further comprising using an automatic image position adjustment algorithm to move said adjustable projection mirror of said rear projection device based on said one or more measured characteristics of light reflected by said adjustable projection mirror for projection onto said rear surface of a projection screen of said rear projection device.

18. The method of claim 15, wherein said rear projection device comprises an image source having an array of image pixels; and wherein said method comprises:
positioning said adjustable projection mirror in a first known position;
selectively activating individual image pixels of said image pixel array one image pixel at a time while said adjustable projection mirror is in its first known position;
sensing the presence of said beam of light produced by a first one of said activated individual image pixels and reflected by said adjustable projection mirror while in its first known position through a fixed projection mirror of said rear projection device onto said rear surface of said projection screen;
positioning said adjustable projection mirror in a second known position;
selectively activating individual image pixels of said image pixel array one image pixel at a time while said adjustable projection mirror is in its second known position;
sensing the presence of said beam of light produced by a second one of said activated individual image pixels and reflected by said adjustable projection mirror while in its first known position through said fixed projection mirror of said rear projection device onto said rear surface of said projection screen;
determining a third position for said adjustable projection mirror based on the identity of said first activated image pixel relative to said first position of said adjustable mirror in combination with the identity of said second activated image pixel relative to said second position of said adjustable mirror; and
positioning said adjustable projection mirror in said third position.

19. The method of claim 18, wherein the presence of said beam of light produced by said first one of said activated individual image pixels is sensed by a first photosensor disposed at a first location on or adjacent said projection screen; and wherein the presence of said beam of light produced by said second one of said activated individual image pixels is sensed by a second photosensor disposed at a second location on or adjacent said projection screen.

20. The method of claim 15, wherein said rear projection device comprises an image source having an array of image pixels, and a measurement light source; and wherein said method comprises:
producing at least three individual measurement light beams corresponding to each of at least three of said four corner image pixel positions of said array of said image source, each of said individual light beams being reflected by said adjustable projection mirror while in a first position through a fixed projection mirror to four corresponding and separate positions on said rear surface of said projection screen;
measuring the light path length of each of said at least three individual measurement light beams;
comparing said measured light path lengths of each of said at least three individual measurement light beams to corresponding pre-determined light path lengths for each of said four corner image pixel positions; and moving said adjustable mirror to a second position, said second position being determined based on the difference between measured light path lengths of each of said at least three individual measurement light beams and its corresponding pre-determined light path length.

* * * * *